United States Patent [19]

Broekema et al.

[11] 3,819,978

[45] June 25, 1974

[54] CIRCUIT ARRANGEMENT FOR BRIDGING A POTENTIAL LEVEL, INCLUDING A CHOPPER

[75] Inventors: Gerhard Willem Broekema; Rijk Hooghordel, both of Emmasingel, Eindhoven, Netherlands

[73] Assignee: U.S. Philips Corporation, New York, N.Y.

[22] Filed: Sept. 20, 1971

[21] Appl. No.: 182,070

[30] Foreign Application Priority Data

Sept. 15, 1970 Netherlands .......................... 7013594

[52] U.S. Cl. .................................................. 315/26
[51] Int. Cl. .......................................... H01j 29/70
[58] Field of Search.......... 315/13 R, 26 R; 330/126

[56] References Cited

UNITED STATES PATENTS

| | | | |
|---|---|---|---|
| 2,778,883 | 1/1957 | Buckerfield | 330/126 X |
| 2,873,309 | 2/1959 | Sass et al. | 330/126 X |
| 2,935,695 | 5/1960 | Wilasuk | 330/126 X |
| 3,151,271 | 9/1964 | Maron | 315/26 X |
| 3,158,692 | 11/1964 | Gerkensmeier | 179/15 A |
| 3,296,464 | 1/1967 | Brault | 330/126 X |
| 3,613,022 | 10/1971 | White | 330/126 |
| 3,619,800 | 11/1971 | Lyghounis | 330/126 |

*Primary Examiner*—Carl D. Quarforth
*Assistant Examiner*—J. M. Potenza
*Attorney, Agent, or Firm*—Frank R. Trifari

[57] ABSTRACT

The invention relates to a circuit arrangement for bridging a potential level. To this end the signals to be processed are superimposed on a chopper signal which has preferably needle-shaped pulses having steep leading and trailing edges. In order to maintain particularly the trailing edge steep, the signal amplifier – which supplies the output signal – is coupled to the chopper – which supplies the chopper signal – via a switching diode. It is ensured that the constant level of the amplitudes of the chopper signal is higher than the peak level of the output signal from the signal amplifier. A further advantage of this coupling method is that a plurality of signal amplifiers can be connected to the same chopper each via their own switching diode. This creates the possibility of controlling both Wehnelt cylinder and focussing electrode from two signal amplifiers, while the output signal from the first signal amplifier is also applied to the second signal amplifier. It is also possible to apply a plurality of input signals to one signal amplifier.

11 Claims, 6 Drawing Figures

*INVENTORS*
GERHARD W. BROEKEMA
RIJK HOOGHORDEL
*BY*
Frank R. Trifari
AGENT

INVENTORS
GERHARD W. BROEKEMA
RIJK HOOGHORDEL
BY
Frank R. Trifari
AGENT

INVENTORS
GERHARD W. BROEKEMA
RIJK HOOGHORDEL
BY
Frank R. Trifari
AGENT

INVENTORS
GERHARD W. BROEKEMA
RIJK HOOGHORDEL
BY
[signature]
AGENT

CIRCUIT ARRANGEMENT FOR BRIDGING A POTENTIAL LEVEL, INCLUDING A CHOPPER

The invention relates to a circuit arrangement for bridging a potential level. One circuit arrangement of this type includes a chopper in which a control signal must be generated at an output terminal and in which the high-frequency components of the control signal are applied through a first capacitor and the low-frequency and direct voltage components are applied through a resistor to this output terminal. A clamping diode circuit is provided between a direct voltage source and said resistor. The low-frequency components superimposed on a chopper signal derived from the chopper are applied through a second capacitor to the junction of said resistor and clamping diode, said circuit arrangement including a signal amplifier for amplification of the control signal.

Such an arrangement is known from the U.S. Pat. No. 3,525,011. In such a circuit arrangement the envisaged object is of course that the applied chopper pulses are as much as possible pulsatory, that is to say, both the leading and the trailing edge of the pulses is as steep as possible (the pulse duration must be as short as possible), because otherwise the pulse-like character is lost at the very high repetition frequency of this pulsatory chopper signal so that the action of the clamping diode with the associated RC member deteriorates. Due to the manner of supplying the control signal as indicated in the known arrangement, namely applying the control signal to the emitter and the chopper signal to the base of the driver transistor (which driver transistor may form part of a multivibrator circuit) two drawbacks are obtained.

1. The output capacitance of the driver transistor plays a role in the determination of the steepness of the supplied chopper signal.
2. The collector output resistance of the driver transistor is also decisive in this case. This collector output resistance must in principle be equal to the input resistor arranged between the emitter of the driver transistor and the signal source. If the signal source is not to be loaded too much, the input resistor should not have too low a value and therefore the output resistor of the driver transistor cannot have a low value either. Since the steepness of the trailing edge deteriorates due to the stand output capacitance and the relatively high output resistance, the pulsatory character of the chopper signal is detrimentally influenced, which as stated above is undesirable.

An object of the circuit arrangement according to the invention is to obviate this drawback and to this end it is characterized in that the first capacitor is coupled directly and the second capacitor is coupled through a coupling resistor to the signal amplifier, an output of the chopper being connected through a switching diode to the junction of the coupling resistor and second capacitor.

The invention is based on the recognition of the following facts. By choosing a relatively high supply voltage for the pulse generator it is always possible to render the amplitudes of the chopper signal larger than the highest value of the output signal from the signal amplifier. This ensures that the coupling diode is blocked upon the occurrence of each pulse of the chopper signal. Furthermore, by ensuring that the amplitudes of the chopper signal have a constant value, the peak level of the ultimate signal (chopper signal plus control signal) applied to the clamping diode is fixed. This has become possible without using a limiter diode (as in the known circuit arrangement) by not using the output stage of the signal amplifier for the amplification of the chopper signal.

A further advantage of the circuit arrangement according to the invention is that due to the use of a diode for coupling the chopper (which may be formed, for example, as an astable multivibrator) different signal amplifiers can be connected each through their own diode to the same chopper. In fact, the value of the signal which is derived from the relevant signal amplifier determines when the diode associated with this amplifier is conductive and when it is non-conductive.

Since switching of each diode is determined by the signal from the associated amplifier, there is a complete freedom in the form of and the desired direct voltage level of each of the signals derived from the different signal amplifiers. Furthermore, it is also possible to couple the output signal from the first signal amplifier not only through the diode to the chopper so as to obtain the chopped output signal, but to apply it also to the second signal amplifier so that it is reversed in phase. The output signal from the second signal amplifier is then likewise coupled through a diode to the chopper. The fact that the phase of the second output signal is opposite to that of the first, and may even have a completely different direct voltage level, is of no significance due to the coupling through the said diodes.

This phase reversal of the signal is particularly of importance when using the circuit arrangement for checking the beam current of a so-called double beam cathode ray-tube as is used for oscillographic purposes. In that case the two beams are obtained by placing a plate provided with two holes between the cathode and the screen of the cathode-ray tube. The electrons emitted by the cathode can only pass through the holes so that two electron beams become available behind the plate. As will be explained hereinafter, these two electron beams shift relative to each other as a function of the intensity modulation thereof by controlling the Wehnelt cylinder $g_1$. This shift is particularly troublesome when it is considered that simultaneously two signals are to be compared on the screen of the oscilloscope. This shift may be avoided if the electrostatic focusing electrode $g_3$ of the cathode-ray tube is controlled in a sense opposite to that of the Wehnelt cylinder. This can be realized in a very simple manner in the circuit arrangement according to the invention, and to this end it is characterized in that two signal amplifiers are provided, the output of the first being coupled with respect to the direct current to the input of the second amplifier and the output terminal associated with the first signal amplifier being connected to the Wehnelt cylinder $g_1$ and the output terminal associated with the second signal amplifier being connected to the focusing electrode $g_3$ of the double beam cathode-ray tube.

In order that the invention may be readily carried into effect, some embodiments thereof will now be described in detail, by way of example, with reference to the accompanying diagrammatic drawings, in which.

Figures 1, 2:
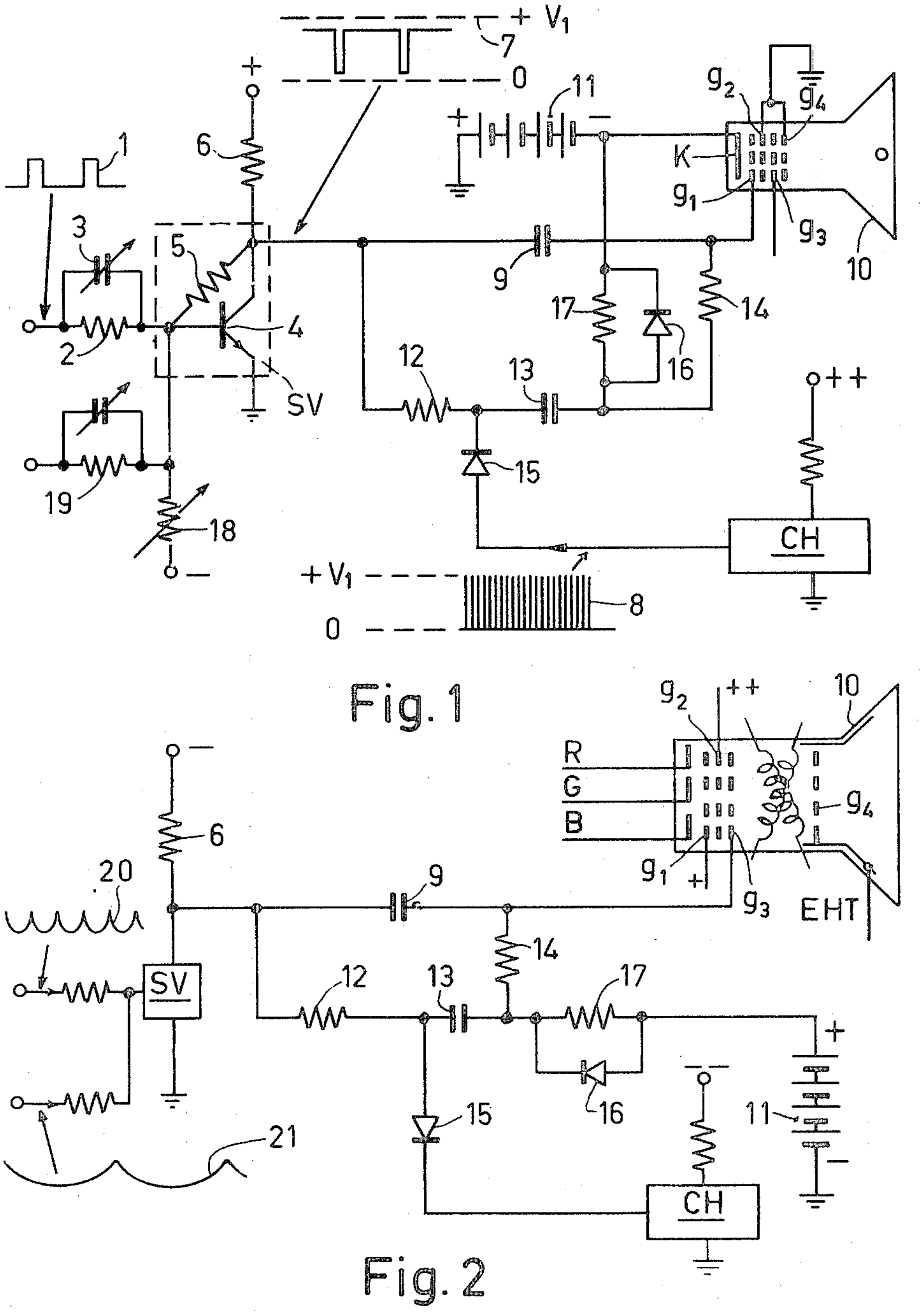
FIG. 1 shows a first embodiment for the control of the Wehnelt cylinder $g_1$ of a cathode-ray tube used for oscillographic purposes.
FIG. 2 shows a second embodiment for the control of the convergence electrode $g_3$ of a colour television display tube.

In the circuit arrangement of FIG. 1 a blocking signal 1 is applied through the parallel arrangement of a resistor 2 and a variable capacitor 3 to the base of a transistor 4 which forms part of a signal amplifier SV. The collector of transistor 4 is connected through a resistor 5 to the base of this transistor and through a resistor 6 to a terminal of the supply voltage. Since transistor 4 is of the npn type, the supply voltage is positive, which is indicated by a + symbol in FIG. 1. The signal 1 appears amplified as a signal 7 at the output of signal amplifier SV. In that case it has been ensured that the actual signal 7 remains below the voltage level indicated by $+V_1$. This level $+V_1$ is equal to the peaks of the chopper signal 8 which is derived from the chopper CH. The supply voltage for chopper CH may preferably be chosen to be higher than the supply voltage for signal amplifier SV, and is denoted by two + symbols. However, when it is ensured that control signal 1 never fully cuts off transistor 4, then it is ensured that signal 7 remains below the supply voltage $+V_1$ and the supply voltage for both signal amplifier SV and for chopper CH may be adjusted at a value of $V_1$ volt.

The signal 7, if a high frequency signal, is applied directly through a capacitor 9 of relatively low value to the Wehnelt cylinder $g_1$ of the cathode-ray tube 10. This Wehnelt cylinder $g_1$ must be at a high negative voltage relative to ground because the cathode K also is brought to a high negative value by means of the direct voltage source 11. In conventional oscilloscope types the cathode K is at −1500 volts and the Wehnelt cylinder $g_1$ must be at a voltage of, for example, − 1550 volt. By means of coupling capacitor 9 of low value, the supply voltage for signal amplifier SV may be maintained at a relatively low value, while yet ensuring with the aid of the circuit arrangement according to FIG. 1 that the signal at the Wehnelt cylinder $g_1$ is active at the desired high direct voltage level.

Furthermore, the signal 7, if it has a low-frequency character, is applied through a coupling resistor 12, a second capacitor 13 and a resistor 14 to the Wehnelt cylinder $g_1$. Capacitor 13 also has a relatively low value and will therefore not pass the low-frequency signal. It is therefore necessary to superimpose these low-frequency components on the chopper signal 8, which according to the principle of the invention is effected by supplying this chopper signal to the junction of resistor 12 and capacitor 13 through a switching diode 15.

Figure 6:
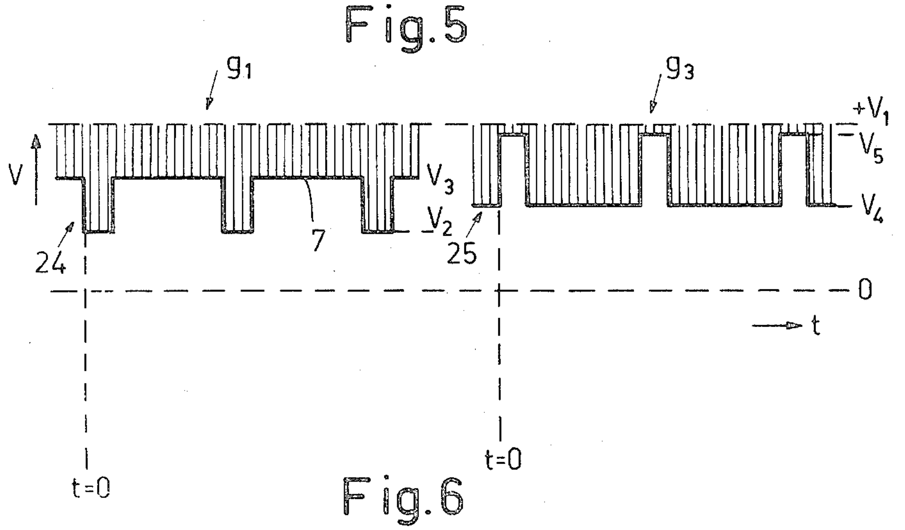
FIG. 6 shows two signals as occur in the circuit arrangement of FIG. 4.

The operation of switching diode 15 may be explained with reference to FIG. 6. In the left-hand part of FIG. 6, the signal 7 is shown once more as it is superimposed on the chopper signal 8. In fact, it has been ensured that the peak level $V_3$ of control signal 7 is always below the peak level $+V_1$ of the positive going pulses of chopper signal 8. During a short occurrence of these pulses, switching diode 15 is unblocked and the voltage at the junction of resistor 12 and capacitor 13 increases to the value $V_1$. As soon as the pulse decreases below one of the levels $V_3$ or $V_2$, whose occurrence is determined by the instantaneous value of control signal 7, the switching diode 15 is blocked. The output signal from diode 15 therefore has the shape as is shown in the left-hand part of FIG. 6. This combined signal can pass through the capacitor 13 of relatively low value and therefore it appears at the clamping diode circuit consisting of the clamping diode 16 and a resistor 17 connected in parallel therewith, This clamping diode circuit will clamp the combined signal passed through capacitor 13 at the level determined by the direct voltage source 11. This means that by adjustment of the level $V_3$ and by suitable choice of the level $V_2$, i.e., the amplitude of signal 7, the mean direct voltage level and the blocking amplitude of the signal ultimately active at the Wehnelt cylinder $g_1$ can be determined. The level $V_3$ is adjusted with the aid of the variable resistor 18 in the base lead of transistor 4. Then a further advantage of the circuit arrangement according to FIG. 1 occurs. In fact, when it is ensured that the peaks of the pulsatory signal 1 saturate transistor 4, the direct voltage level at the base of transistor 4 when adjusted by means of the resistor 18 will exclusively exert an influence on the location of the level $V_3$ in the output signal 7. In fact, the level $V_2$ which is determined by the saturation of transistor 4 remains in the same plate. It is achieved thereby that the control with the aid of resistor 18 not only shifts level V3 but also varies the amplitude of signal 7. The cut-off of the beam current to a greater or lesser extent in the cathoderay tube 10 is also controlled thereby. As a result the level $+V_1$ may be lower than in the known arrangement in which the amplitude of signal 7 remained unchanged in case of variation of the level $V_3$. The cut-off of the beam current to a greater or lesser extent in the cathode-ray tube 10 therefore had to be accompanied by a much stronger shift of the level $V_3$ which made it necessary that the limiter diode used in the known arrangement had to stand a higher peak voltage than the switching diode 15 of FIG. 1. Due to this fact an extra advantage is achieved, namely that the self capacitance of diode 15 may be lower than the self capacitance of the limiter diode in the known arrangement. In the further calculation it will become apparent that the total parasitic capacitance seen by the chopper signal can become lower. Since the steepness of the leading edge of the pulses of chopper signal 8 is completely determined by the chopper CH itself, for example, in that the current is then completely determined by the conductance of one of the transistors of an astable multivibrator, it is ensured that this steepness is always sufficiently large. In a practical embodiment the steepness of the leading edge was 15 nsec out of a total pulse duration of 250 nsec. Since the total output capacitance of chopper CH is approximately 3 pF, the self capacitance of diode 15 is approximately 1 pF and the output resistance of chopper CH is approximately 1 kOhm, a total decay time $\tau_r$ for the pulses of the chopper signal 8 is obtained.

$\tau_r = 2.2\ RC = 2.2 \cdot 10^3 \cdot 4 \cdot 10^{-12} \approx 9$ nsec. Since a decay time of 9 nsec. can be assumed for a pulse duration increase of 4.5 nsec. and also a rise time of 15 nsec. can be assumed for a pulse duration increase of 7.5 nsec. (all this because ultimately the pulse surface, i.e., the product of amplitude and time, is concerned) a total pulse duration of 7.5 + 250 + 4.5 = 262 nsec. is obtained.

In the known arrangement the total output capacitance was 7 pF while the output resistance had a value of 18 k. Ohm. Consequently a pulse decay time $\tau_r = 2.2$ RC = 2.2. $18 \cdot 10^3 \cdot 7 \cdot 10^{-12} \approx$ 277 nsec. was obtained. Also in this case the rise time rate of the pulses can be assumed to be 15 nsec. so that there is obtained from the know arrangement a total pulse duration of the chopper signal pulses of 7.5 + 250 + 138.5 = 396 nsec.

This means that the pulse duration of the chopper signal from the known arrangement is 396 nsec. which is considerably more than the duration of 262 nsec. in the arrangement according to the invention. It will be evident that for the same pulse repetition frequency of the chopper signal 8, the pulsatory character in the circuit arrangement of FIG. 1 is better maintained than in the known arrangement.

A further advantage of the circuit arrangement of FIG. 1 is that a plurality of signals can be applied to the base of transistor 4. This is shown in FIG. 1 in that a different control signal can be applied to a further input terminal 19. The terminal 19 may be, for example, an external connection of the oscilloscope to which a signal can be applied from the exterior which is to be used for realizing the intensity moduation of the cathode-ray tube 10.

Also in the circuit arrangement of FIG. 2 the fact has been used that a plurality of control signals can be simultaneously applied to signal amplifier SV. The circuit arrangement according to FIG. 2 serves to control the focusing electrode $g_3$ of a colour television display tube 10. The colour television display tube 10 is of the type comprising a single gun which supplies 3 electron beams at the same time, which beams are emitted by the 3 cathodes. The 3 chrominance signals R, G and B are applied to these cathodes for the purpose of modulating the 3 electron beams, which determine the colour rendition. As is known a parabola signal of line frequency and a parabola signal of field frequency must then be applied to the focusing electrode $g_3$. However, since the focusing electrode $g_3$ is at a potential of 4.5 k. volt relative to ground, it is also necessary in this case to bridge the direct voltage level at the output of signal amplifier SV and the direct voltage level at the focusing electrode $g_3$. This can be achieved with the circuit arrangement according to the invention which operates in a manner fully corresponding to the operation of the circuit arrangement of FIG. 1 and in which the same parts have the same reference numerals. The only difference is that the direct voltage source 11 supplies a positive voltage, whereas the supply voltages for signal amplifier SV and chopper CH are negative, while diodes 15 and 16 are reversed. A parabola signal 20 of line frequency and a parabola signal 21 of field frequency are then applied to the input of signal amplifier SV. The signal 20 may be considered to be a high-frequency signal which has a frequency of more than 15 kHz and which is therefore directly applied through capacitor 9 to the focussing electrode $g_3$. The signal 21 of a field frequency of from 50 to 60 Hz is, however, to be considered as a low-frequency component which is applied through coupling resistor 12, capacitor 13 and resistor 14 to the focussing electrode $g_3$ and which is superimposed on the chopper signal which is derived from chopper CH through switching diode 15.

Figure 3:
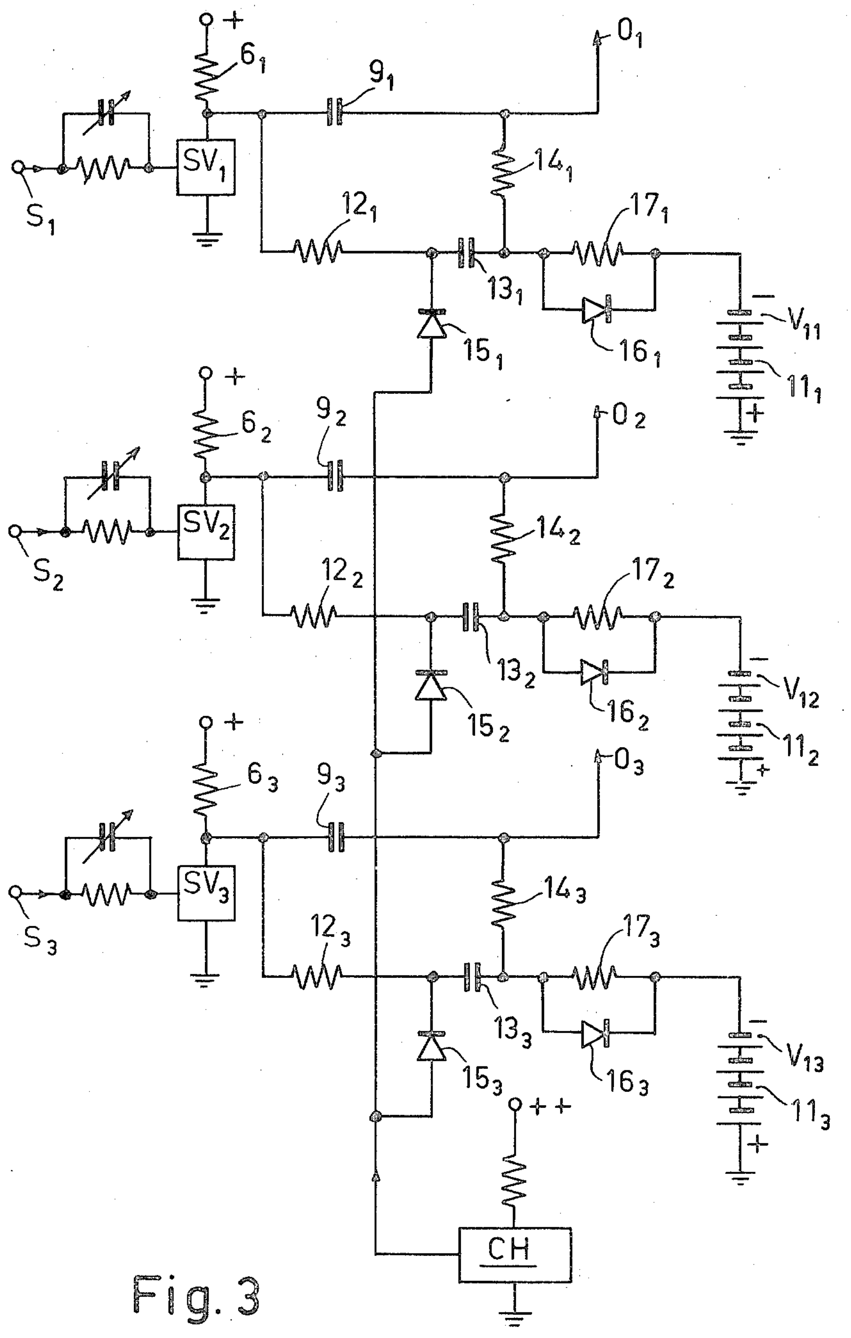
FIG. 3 shows an embodiment with which 3 different output signals can be obtained, while needing only one chopper so as to supply the chopper signal for coupling to the 3 associated signal amplifiers.

As already described in the preamble, the circuit arrangement according to the invention makes it possible to use a plurality of signal amplifiers SV and to superimpose on the signal derived from these signal amplifiers the chopper signal from a single chopper CH through the coupling diode associated with each signal amplifier. This is shown in the circuit arrangement of FIG. 3 showing by way of example 3 signal amplifiers $SV_1$, $SV_2$, $SV_3$. Of course, if desired, the circuit arrangement may be extended to include more signal amplifiers which must then be arranged in a corresponding manner as is shown in FIG. 3. Completely different control signals can then be applied to the input terminals $S_1$, $S_2$ and $S_3$ of the three signal amplifiers, which signals also may have completely different direct voltage levels. It is only to be ensured that the highest levels of the control signals derived from the outputs of the three signal amplifiers are always located below the level $V_1$ of chopper signal 8. In that case it is ensured that each switching diode $\mathbf{15_1}$, $\mathbf{15_2}$ and $\mathbf{15_3}$ is individually turned on and off by the control signal from the signal amplifier associated with the relevant diode.

Also the direct voltages $V_{11}$, $V_{12}$ and $V_{13}$ supplied by the three direct voltage sources $\mathbf{11_1}$, $\mathbf{11_2}$ and $\mathbf{11_3}$, respectively, may be different, because a separation between the direct voltage level of the signal amplifiers and that of the clamping diode circuit is always present due to the capacitors $\mathbf{13_1}$, $\mathbf{13_2}$ and $\mathbf{13_3}$.

As already stated in the preamble a circuit arrangement as described with reference to FIG. 3 is particularly suitable for controlling a double beam cathode-ray tube, as is shown in the circuit arrangement according to FIG. 4. In that case it is necessary for the voltage at the focusing electrode $g_3$ to vary in an opposite sense with the voltage at the Wehnelt cylinder $g_1$. This may be explained with reference to FIG. 5. FIG. 5 shows 3 examples from which it is apparent that two beams I and II are formed after the electrons emitted by the cathode K have passed the splitting electrode Se. The beams in FIG. 5 are shaded and it is clearly apparent that without the splitting electrode Se in the upper Figure the spot P would exactly constitute a dot at the area of the screen S. In the case of the central Figure, the spot P′ is located to the right of screen S and in the case of the lower Figure the spot P″ is located to the left of screen S. Thus, if the state shown in the central Figure is changed over to the state shown in the upper Figure and then again to the state shown in the lower Figure, then it can be seen that the partial spots $P_{dI}$ and $P_{dII}$ shift towards each other and subsequently part again in the reverse direction. For a double-beam tube all this results in a vertical shift of the partial spots $P_{dI}$ and $P_{dII}$ in the vertical direction.

There are two reasons for this shift. In the first place the crossover C will be displaced as a result of the intensity modulation of the electron beam due to control to the Wehnelt cylinder $g_1$. This has a defocussing effect relative to the spot P, or in other words this results in a shift of beams I and II.

The second reason is the space charge of the electron beam. In fact, all electrons have a negative charge and, as is known, similar charges repel each other. In case of a greater intensity of the electron beam, more electrons are present therein and the repelling action will be greater which results in a divergence of the beam, that is to say, the beams I and II will shift away from each other with increasing intensity.

The remedy for this is to cause the voltage on the focusing electrode, as already stated, to vary in the opposite sense with the voltage on the Wehnelt cylinder, because then a focusing action of $g_3$ counteracts the defocussing action on $g_1$.

Figure 4:
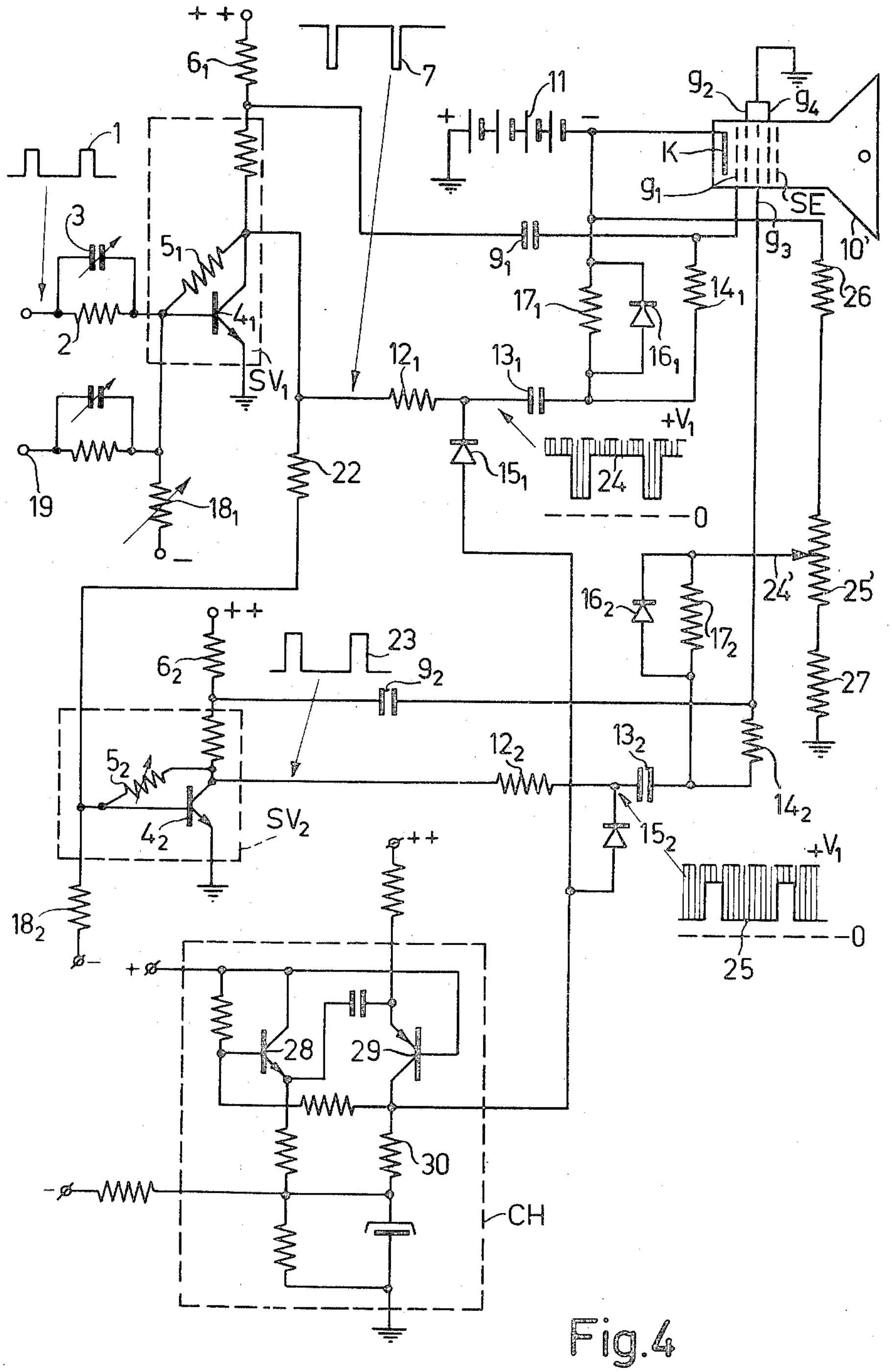
FIG. 4 shows a special embodiment of the circuit arrangement according to FIG. 3 for the control of a double beam cathode-ray tube.
Figure 5:
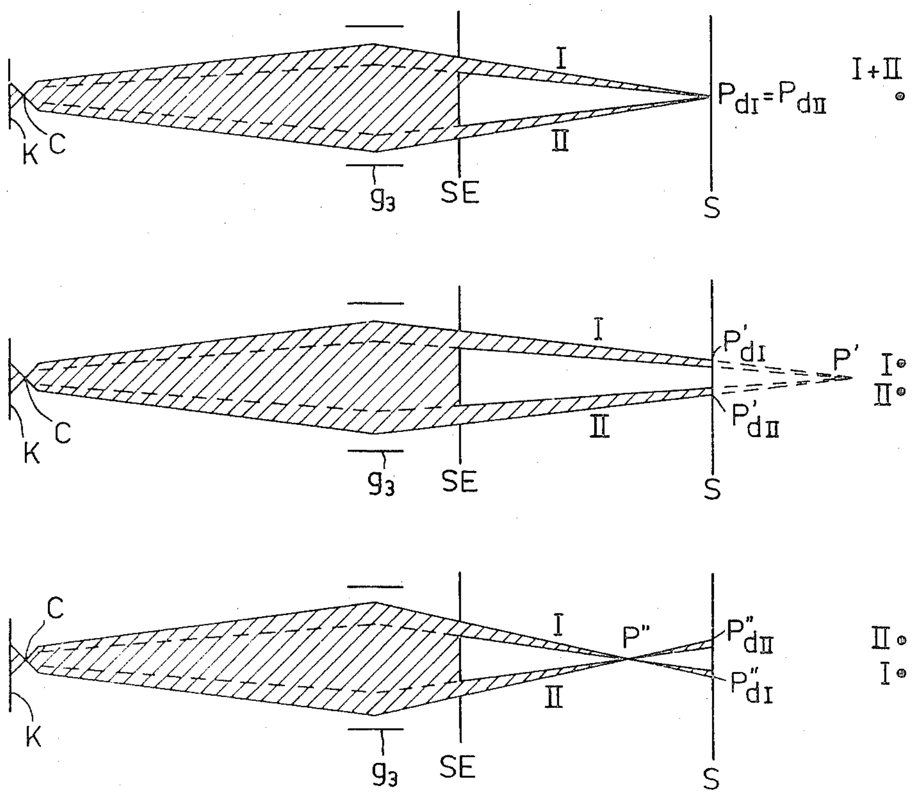
FIG. 5 shows three different states which may occur in a double beam cathode-ray tube of FIG. 4.

This is achieved in the circuit arrangement according to FIG. 4 by applying the signal from the first signal amplifier $SV_1$ not only through capacitor $9_1$ and resistor $12_1$ to the Wehnelt cylinder $g_1$, but also through resistor 22 to the second signal amplifier $SV_2$ so that a signal 23 is produced at its output. The latter signal is opposite in phase to signal 7. This output signal is applied at one end through capacitor $9_2$ and at the other end through coupling resistor $12_2$ to the focusing electrode $g_3$. In a corresponding manner as for FIG. 1, capacitor $9_2$ in this case also serves to pass the high-frequency components, while the low-frequency components pass through resistor $12_2$.

If the input signal 1 is a low-frequency signal, signal amplifier $SV_1$ also supplies a low-frequency output signal which is superimposed on the chopper signal so that a signal 24 is available at the junction of coupling resistor $12_1$ and second capacitor $13_1$. The same signal is reversed in phase by the second signal amplifier $SV_2$ and appears superimposed on the chopper signal as a signal 25 at the junction of coupling resistor $12_2$ and capacitor $13_2$. These signals 24 and 25 are once more shown in greater detail in FIG. 6. In that case it has been assumed that the peak level of signal 24 is $V_3$ and the minimum level is $V_2$. For signal 25 these are the levels $V_5$ and $V_4$, respectively. By using the switching diodes $15_1$ and $15_2$ this need not provide any drawback, if it is only ensured that the levels $V_3$ and $V_5$ remain below the peak level $V_1$ of the chopper signal. Then it is always ensured that each diode is separately blocked and unblocked as a function of control signals 7 and 23, respectively.

Finally it is to be noted that the level at which the clamping circuit comprising diode $16_2$ and resistor $17_2$ clamps the signal 25 is adjustable by means of the variable tap 24' on resistor 25'. Resistor 25' forms part of a potentiometer which furthermore consists of the resistors 26 and 27. The total potentiometer constituted by resistors 25', 26 and 27 is likewise connected to the voltage supply source 11. This means that the direct voltage for the focusing electrode $g_3$ is adjusted with the aid of tap 24', that is to say, tap 24' serves for the static focusing adjustment.

The amplitude of output signal 23 is adjusted with the aid of resistor $5_2$ arranged between collector and base of transistor $4_2$, that is to say, resistor $5_2$ serves for the dynamic focusing adjustment.

Furthermore, FIG. 4 shows chopper CH in detail, and this chopper acts as an astable multivibrator. This multivibrator comprises 2 transistors 28 and 29 of opposite conductivity type. The chopper signal is derived from the collector resistor of transistor 29 and has the value of 1 kOhm. Thus this resistor has the value which was used in the foregoing to calculate the decay time of the pulses. However, in the case of the circuit arrangement of FIG. 4 the capacitance is increased by 1 pF because there are now two switching diodes $15_1$ and $15_2$ provided, each having a self capacitance of one picofarad. This renders the total decay time of the pulses at 11 instead of 9 nsec as in the case of the circuit arrangement according to FIG. 1. However, since this exerts an influence for only 50 percent on a total pulse surface, the actual pulse duration becomes 263 nsec instead of 262 nsec.

We claim:

1. A circuit arrangement for bridging two potential levels to supply a control signal at a first output terminal comprising, a signal amplifier having an output terminal at a first voltage level at which said control signal is developed, means for directly coupling the high-frequency components of the control signal at the amplifier output terminal through a first capacitor to said first output terminal, a resistor for applying the low-frequency and direct voltage components of the control signal to said first output terminal, a clamping diode circuit connected between said resistor and a terminal of a direct voltage source at a second voltage level, a second capacitor connected to the junction of said resistor and clamping diode, means for coupling the second capacitor through a coupling resistor to the output terminal of the signal amplifier, a chopper, a switching diode, and means connecting an output of the chopper through said switching diode to the junction of the coupling resistor and the second capacitor whereby the low frequency components of the amplifier control signal are superimposed on the chopper signal and are coupled to said first output terminal via the second capacitor and the resistor.

2. A circuit arrangement as claimed in claim 1 wherein the signal amplifier comprises a transistor arranged in common emitter configuration with a base electrode adapted to receive a control signal and the first capacitor and the coupling resistor being connected to the collector electrode of the transistor which constitutes the amplifier output terminal.

3. A circuit arrangement as claimed in claim 1 further comprising a plurality of signal amplifiers to which different control signals are applied, a first output terminal together with a clamping diode circuit, first and second capacitors and a coupling resistor being individually connected with each signal amplifier in a manner similar to that of the first signal amplifier circuit arrangement, a number of switching diodes equal to the number of first output terminals, and means connecting the output of a single chopper through individual switching diodes to a junction of a corresponding second capacitor and coupling resistor of the relevant first output terminal.

4. A circuit arrangement as claimed in claim 1 for checking the beam current of a double beam cathode-ray tube further comprising a second signal amplifier having an output terminal at a first voltage level, a third capacitor directly coupling the second amplifier output terminal to the focusing electrode of the cathode ray tube, a second coupling resistor, a fourth capacitor, second resistor, means connecting the second amplifier output terminal to the focusing electrode via said second coupling resistor, said fourth capacitor and said second resistor, a second clamping diode circuit connected between said second resistor and a terminal of a direct voltage source at a second voltage level, a second switching diode coupling the output of the chopper to the junction of the second coupling resistor and the fourth capacitor, and DC coupling means connecting the output of the first amplifier to the input of the second amplifier, and wherein the first output terminal associated with the first signal amplifier is connected to the control grid of the double beam cathode-ray tube.

5. A circuit arrangement comprising, a signal amplifier having an output electrode at a first voltage level, an output terminal for the circuit, a first capacitor directly coupled between said output electrode and said output terminal for passing the high frequency components of a control signal developed at said amplifier output electrode, a first resistor, a clamping diode circuit, a second terminal at a second voltage level, means including said first resistor and said clamping diode circuit for connecting said output terminal to said second terminal, a second capacitor, a second resistor means including the series combination of said second resistor and said second capacitor for coupling the amplifier output electrode to a junction point between the first resistor and the clamping diode circuit, a switching diode, and a chopper having its output coupled through said switching diode to the junction of the second resistor and the second capacitor so as to supply to said output terminal chopper pulses amplitude modulated by the low frequency components of the control signal from the amplifier output electrode.

6. A circuit as claimed in claim 5 wherein said first resistor and said clamping diode circuit are serially connected, in the order named, from the output terminal to said second terminal, and wherein said second resistor and said second capacitor are serially connected, in the order named, from the amplifier output electrode to the junction between the first resistor and the clamping diode circuit.

7. A circuit as claimed in claim 5 wherein said signal amplifier comprises first and second input terminals adapted to receive a low frequency signal and a high frequency signal, respectively.

8. A circuit as claimed in claim 5 further comprising, a second signal amplifier having an output electrode at a given voltage level, a second output terminal for the circuit, a third capacitor directly coupling the high frequency components of a signal at the output electrode of the second amplifier to the second output terminal, a third terminal at another voltage level, a third resistor, a second clamping diode circuit, means including said third resistor and said second clamping diode circuit for connecting said second output terminal to said third terminal, a fourth capacitor, a fourth resistor, means including the series combination of the fourth resistor and the fourth capacitor for coupling the second amplifier output electrode to a junction point between the third resistor and the second clamping diode circuit, a second switching diode, and means connecting the output of said chopper through said second switching diode to the junction of the fourth resistor and the fourth capacitor.

9. A circuit as claimed in claim 8 wherein each of said signal amplifiers includes an input electrode adapted to individually receive an input signal that is independent of the other input signal.

10. A circuit as claimed in claim 8 further comprising means for DC coupling the output electrode of the first amplifier to an input electrode of the second amplifier whereby the signal appearing at the output electrode of the second amplifier is determined by the signal at the output electrode of the first amplifier, and means directly connecting said second and third terminals to a common source of voltage to provide the desired voltage level at said terminals.

11. A circuit as claimed in claim 8 further comprising means for coupling the output electrode of the first amplifier to an input electrode of the second amplifier whereby the signal appearing at the output electrode of the second amplifier is in phase opposition to the signal at the output electrode of the first amplifier, and means connecting said first and second output terminals to the control electrode and the focusing electrode, respectively, of a double beam cathode ray tube whereby the voltages on said focusing electrode and said control electrode are caused to vary in opposite sense by said control signal.

* * * * *